March 15, 1960 P. RUSNAK 2,928,647
INSTANT RELEASE VALVE
Filed Nov. 10, 1958

PAUL RUSNAK
INVENTOR.

BY *White & Haefliger*

ATTORNEYS.

United States Patent Office 2,928,647
Patented Mar. 15, 1960

2,928,647

INSTANT RELEASE VALVE

Paul Rusnak, Los Angeles, Calif.

Application November 10, 1958, Serial No. 772,926

4 Claims. (Cl. 251—74)

This invention relates generally to valves, particularly fire extinguisher valves especially useful on aircraft, naval vessels and other military installations where extremely rapid and completely reliable operation or discharge of fire extinguishing fluid is desired.

In view of the rather complex nature of the equipment presently being uesd for controlling the discharge of fire extinguishing fluid from high pressure containers, it is believed that there is a great need for an extremely simple valve which is entirely mechanically operable and which will function properly through extreme temperature and pressure ranges, and which will be unaffected in its operation by rapid acceleration, extreme vibration and by the type of fire extinguishing liquid to be released from the high pressure container.

Accordingly, applicant has invented such a valve, which has been found to be capable of inexpensive manufacture, is extremely simple in design and is completely reliable through a temperature range of —60° F. to 200° F. as well as at altitudes up to 50,000 feet. The valve functions instantaneously under its own pressure regardless of what the latter may be, as will be described.

In keeping with the broadest aspects of the invention, the valve, which is operable to quickly release a confined fluid pressure, comprises means forming a passage having an inlet and an outlet, a seat in the passage through which pressure is releasable from the inlet to the outlet, a piston or poppet type stopper rapidly movable relatively downstream in the passage by the force of the confined pressure and from a first location in which the stopper engages the seat blocking pressure release, to a second location in which the stopper is spaced from the seat unblocking pressure release to the outlet, and finally means at the downstream side of the stopper blocking movement thereof. The latter means transmits force acting to hold the stopper in pressural engagement with the seat, and it is almost instantaneously shiftable away from the stopper thereby allowing the rapid downstream stopper movement in the passage. More particularly, the last means referred to preferably includes a ball engaging the downstream side of the stopper piston supporting a plastic seal in pressural engagement with the seat. The outlet is typically, but not necessarily, at the side of the passage and the stopper when engaging the seat also obstructs the outlet. Compressively supporting the ball is a stem projecting toward the piston and which is swingable by an arm outside the body to displace the ball out of blocking relation to the stopper, the ball engagement with the stem and stopper piston offering least resistance to such swinging movement. The use of a ball moreover provides for maximum safety in that force transmission to the stem is entirely by compression, suitable seats in the stem and the piston serving to distribute the transmitted loading without unnecessarily hampering the displacement of the ball out of blocking relation to the piston.

The invention also contemplates the provision of releasable latch means holding the arm against inadvertent swinging movement outside the body such as would release the piston or stopper, all as will be described. Also, an alternative form of the invention substitutes a dog in engagement with the piston, the dog being movable laterally out of blocking relation to the piston as for example, by a heavy compression spring. Releasable latch means normally holds the dog in blocking relation to the piston. At least one of the interengaged dog and piston surfaces is convex and the other surface has less curvature than the convex surface, so that relative sliding movement of the dog and piston is facilitated, to the extent that quick opening response of the piston is realized.

These and other objects and advantages of the invention, as well as the details of an illustrative embodiment, will be more fully understood from the following detailed description of the drawings, in which.

Figure 1:
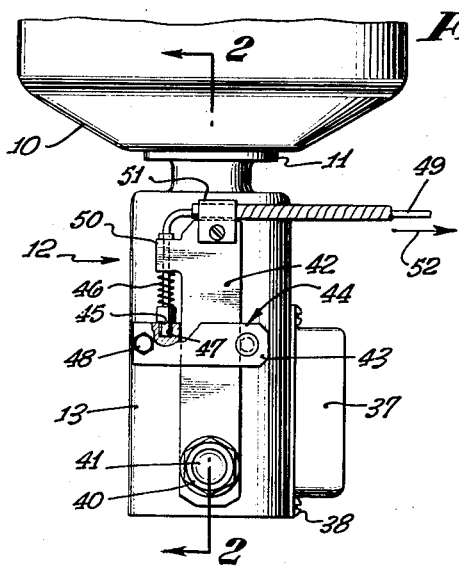
Fig. 1 is an exterior view of the valve body and the container to which it is connected.

In the drawings, a high pressure container is indicated at 10. Typically, but not necessarily, it will contain a fire extinguisher fluid such as Freon, pressurized with nitrogen to a pressure of up to 600 pounds per square inch. Since the fire extinguisher is to be carried on aircraft or on naval vessels, it is an absolute requirement that it be almost instantaneously usable, when necessary, to jet the high pressure fluid on flash fires, such as may occur for example on jet engines.

Figure 2:
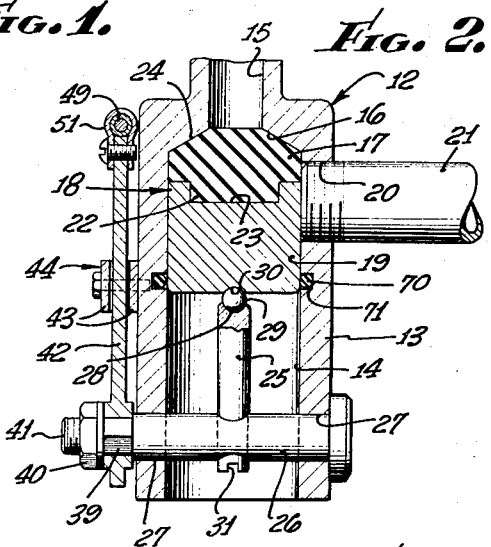
Fig. 2 is a section taken on line 2—2 of Fig. 1.

Suitably connected at 11 to the container 10, is a valve assembly generally indicated at 12. The latter includes a tubular body 13 containing a passage or bore 14 and a reduced throat 15 forming the inlet to the passage 14. Between the throat and passage is a frustroconical seat 16 against which the plastic seal portion 17 of a stopper 18 is shown as being seated in Figs. 2, 3 and 5. The plastic seat may typically consist of hard rubber, asbestos, tetrafluoroethylene or other suitable materials which are chemically inert and stable under wide ranges of temperature and pressure.

Mounting the seal 17 is a cylindrical piston 19 forming a second portion of the stopper, which completely obstructs the outlet 20 from the passage 14. That outlet typically receives a pipe fitting 21 and is adapted to conduct the high pressure fluid escaping from the container 10. The plastic seal portion 17 of the stopper includes a boss 22 which is downwardly received within a central recess 23 in the piston, as shown in the drawings, so that the seal is at all times centered with respect to the piston and is symmetrically supported thereby.

When the valve stopper is closed, blocking pressure release to the outlet 20, the frustro-conical seal surface 24 is held in pressural engagement against the seat 16 by the means now to be described, located at the downstream side of the stopper 18, and which includes a stem 25 threaded into a shaft 26 extending transversely across the passage 14, and suitably bearing supported for easy turning at locations 27. The stem 25 is recessed at 28 to receive and mount a load transmitting ball 29 which in turn is seated within a central recess 30 in the underside of the piston 19, both recesses 28 and 30 being spherical and having substantially the same curvature as that of the ball. The opposite end of the central stem 25, which projects below the shaft 26, is notched at 31 so as to be adjustably threadable at 32 in the shaft 26, resulting in compressive loading of the ball 29 against the piston 19, forcing the seal portion 17 of the stopper into pressural engagement with the seat 16. Thus, it is possible to so adjust the stem 25 as to achieve desired pressure sealing of the valve against any pressure to be contained in the vessel 10.

On the other hand, such adjustable sealing of the valve to extremely high pressures does not interfere with its rapid and almost simultaneous operation to release the confined pressure. This is so, since the stem 25 may be swung to the position shown in Fig. 4 almost instantaneously as facilitated by the very low frictional resistance to stem turning offered by the metal ball 29 seated against both the metal stem and the underside of the metal piston 19 in the shallow recesses 28 and 30. Relative ease of swinging of the stem 25 is further enhanced by the tapered groove 33 cut in the underside of the piston 19 and extending laterally in the direction of travel of the ball 29 as it rolls out of the recess 30. As illustrated, the tapered groove 33 intersects the recess 30 at a depth almost but not quite equal to the depth of the recess so that there is a slight resistance to turning of the stem 25 to the position shown in Fig. 4. Once the stem has begun to swing away from its axial position, its turning motion is self energized by the pressure of the fluid in the container acting against the stopper and acting as a toggle to turn further the stem.

It will be further observed that the loading exerted from the stopper and stem 25 is entirely compressive as distinguished from bending or shear loading. Thus, the valve releasing means is so constructed as to be completely dependable and cannot malfunction.

Figure 3:
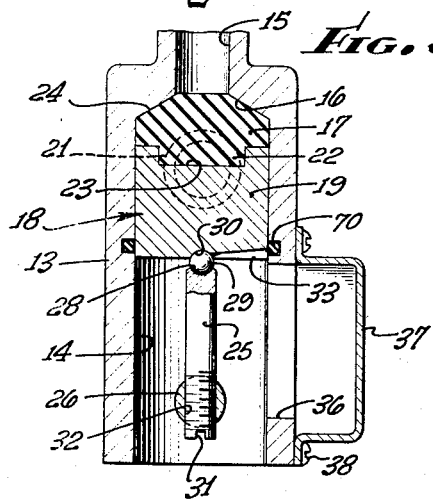
Fig. 3 is a view similar to Fig. 2, but taken at right angles thereto and showing the stopper seal engaging the valve seat to block pressure release from the container.
Figure 4:
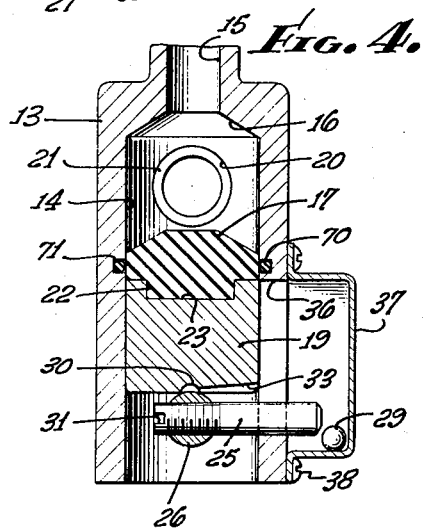
Fig. 4 is a view similar to Fig. 3 but showing the piston in its released position allowing escape of confined pressure through the valve.

In Figs. 3 and 4 there is shown a side opening 36 from the body 13, which is covered by receptacle 37 fastened to the body. This receptacle is adapted to catch the ball 29 as it is thrown outward in response to turning of the stem 35 to the position shown in Fig. 4. For resetting the valve, the receptacle 37 is removed as by the screws 38, so that the piston 19 may be lifted and the ball placed in the socket or recess 28 at the end of the stem, following which the stem and ball may be swung upwardly to the position shown in Fig. 3. Thereafter, the receptacle 37 can be replaced.

Turning back to Figs. 1 and 2, the shaft 26 is shown to have a flat sided end portion 39, for example, a square cross-section which projects outwardly from the body 13. Attached to this portion 39 as by means of the nut 40 screwed on the threaded end 41 of the shaft 26 is an arm 42. The latter extends vertically between the arms 43 of a bracket 44 wherein it is held in position by the releasable latching mechanism now to be described. That mechanism includes a latch 45 urged by a compression spring 46 into a recess 47 in the bracket 44. The bracket of course is attached to the body 13 as shown at 48.

The latch 45 is releasable from the recess 47 by means of a flexible cable 49 to which the latch is attached, the cable running up through the projection 50 from the arm 42 and then laterally through a bearing clip 51 also attached to the arm 42. When the cable 49 is pulled in the direction of the arrow 52, the latch 45 is released, permitting the arm to swing in the direction of the arrow 52 when it is desired to release the main valve. Of course, the safety latch 45 is normally engaged in the bracket 44 during shipping of the valve assembly and container 10, whereas the safety latch is released to permit desired operation of the valve during operational conditions such as during aircraft flight.

Figure 5:
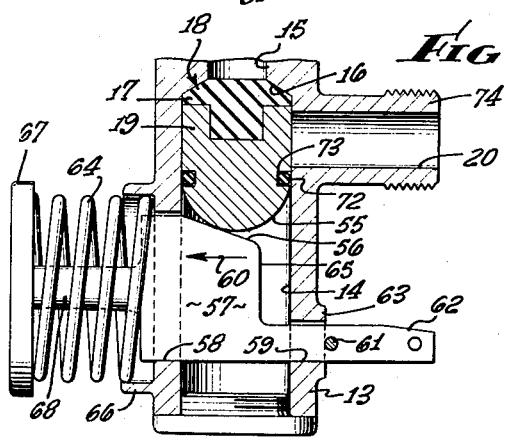
Fig. 5 is a view of a somewhat modified form of the invention.

Referring now to the modified form of the invention shown in Fig. 5, the lower end of the piston 19 is illustrated as being convex at 55, and in engagement with a tapered surface 56 of a dog 57 in the passage 14. The pressure of the confined fluid in the container, not shown, is transmitted through the inlet 15 to the stopper 18 and then to the dog 57 which bears against the lower edges of the side openings 58 and 59 in the body 13. Thus, loading is ultimately transmitted to the body 13 which is connected to the container 10. Under these conditions, the stopper sealing portion 17 is held in pressural engagement with the seat 16 by the dog 57, which is in turn held against lateral displacement in the direction of arrow 60 by a removable pin 61. The latter projects through an extension 62 of the dog and engages a boss 63 on the body 13.

When it is desired to operate the valve to release the confined pressure, the pin 61 is pulled from its opening in the dog extension 62, at which time the heavy compression spring 64 at the opposite side of the body 13 almost instantaneously urges the dog in the direction of arrow 60 to an extent permitting downward displacement of the stopper 18 in the passage 14. The heavy spring 64 is retained between an annular flange 66 integral with the body 13 and a head 67 connected with a stem 68 integral with the dog 57 as shown. Resetting of this form of the valve involves lifting the stopper 18 and pushing the head 67 toward the boss 13 to compress the spring 64.

In the form of the invention shown in Figs. 1 through 4, the confined pressure in the container 10 upon being released flows through the outlet duct 21, and does not escape below the piston 19. This is due to the provision of an annular seal ring 70 retained in a body groove 71 and in sealing engagement with the stopper 18 throughout its downward travel. In Fig. 5 a similar seal ring 72 is retained in a groove 73 formed in the piston 19, the ring remaining at all times in sealing engagement with the bore or passage 14, as illustrated. Also, in Fig. 5, the outlet 20 is formed by a boss 74 integral with the body 13.

I claim:

1. Valve apparatus operable to release almost instantaneously a confined extremely high fluid pressure, said apparatus comprising a body forming an axially extending bore having an inlet at one end thereof and an outlet at one side of the passage, an annular seat in said bore through which confined pressure is releasable from said inlet to said outlet, a stopper including a piston and a seal mounted on the piston rapidly movable longitudinally downstream in said bore by the force of said confined pressure and from a first location in which the seal engages said seat and the stopper blocks the outlet to a second position in which the seal is spaced from the seat and the stopper is completely clear of the outlet unblocking pressure release to said outlet, and means at the downstream side of said stopper piston blocking said movement thereof, said means including an anti-friction part positioned at the bore axis and having a convex surface in engagement with a piston, a laterally extending axle supported by said body at laterally opposite sides of said bore axis, means connected with the axle for rotating the axle, said body having two laterally spaced openings in which the axle is received and supported, said axle being spaced longitudinally from said part, and an axially extending pusher carried by said axle within said bore and mounting said part at the terminal end of said pusher, said pusher being axially adjustable in said bore to move said part axially relative to said axle and being advanced toward the piston sufficiently to urge said part compressively against the piston thereby pressing the stopper seal against said seat with sufficient pressure to block escape of said confined high fluid pressure, whereby initial rotation of said axle moving said pusher and part laterally away from said bore axis is accompanied by almost instantaneous fluid pressure induced bodily movement of the stopper away from the seat and toward and against said part acting to accelerate said part and pusher out of blocking relation to the stopper in said bore.

2. The invention as defined in claim 1 in which said pusher is in threaded engagement with said axle, said body includes bearings supporting said axle at locations transversely spaced equally and oppositely with respect to the bore axis, said axle projects transversely at the exterior of said body, and said means connected with the axle includes an actuating arm operatively connected with the axle projection.

3. The invention as defined in claim 2 in which said anti-friction part comprises a ball, said pusher terminal end and said piston having concave recesses closely fitting portions of the ball, and in which said body contains a side passage located transversely of said pusher and toward which said pusher and ball are rotatable by said axle, whereby said side passage provides access to said pusher and ball for placing said ball at the bore axis and in said pusher and piston recesses so that the pusher may then be advanced to force the stopper against the seat, and a cover for said side passage having a recess to retain the ball after the ball is rotated toward said side passage.

4. The invention as defined in claim 1 including an annular seal between said piston and body bore sealing off therebetween downstream of said outlet, whereby upon movement of the stopper away from said seat said released high pressure remains confined at the outlet side of the stopper for flow to said outlet.

References Cited in the file of this patent

UNITED STATES PATENTS

| | | |
|---|---|---|
| 1,764,991 | Siebs | June 17, 1930 |
| 2,620,815 | Margraf et al. | Dec. 9, 1952 |
| 2,664,956 | Barz | Jan. 5, 1954 |
| 2,730,179 | Ferguson | Jan. 10, 1956 |
| 2,778,599 | Paul | Jan. 22, 1957 |

FOREIGN PATENTS

| | | |
|---|---|---|
| 795,232 | France | Mar. 9, 1936 |